Figure 1:
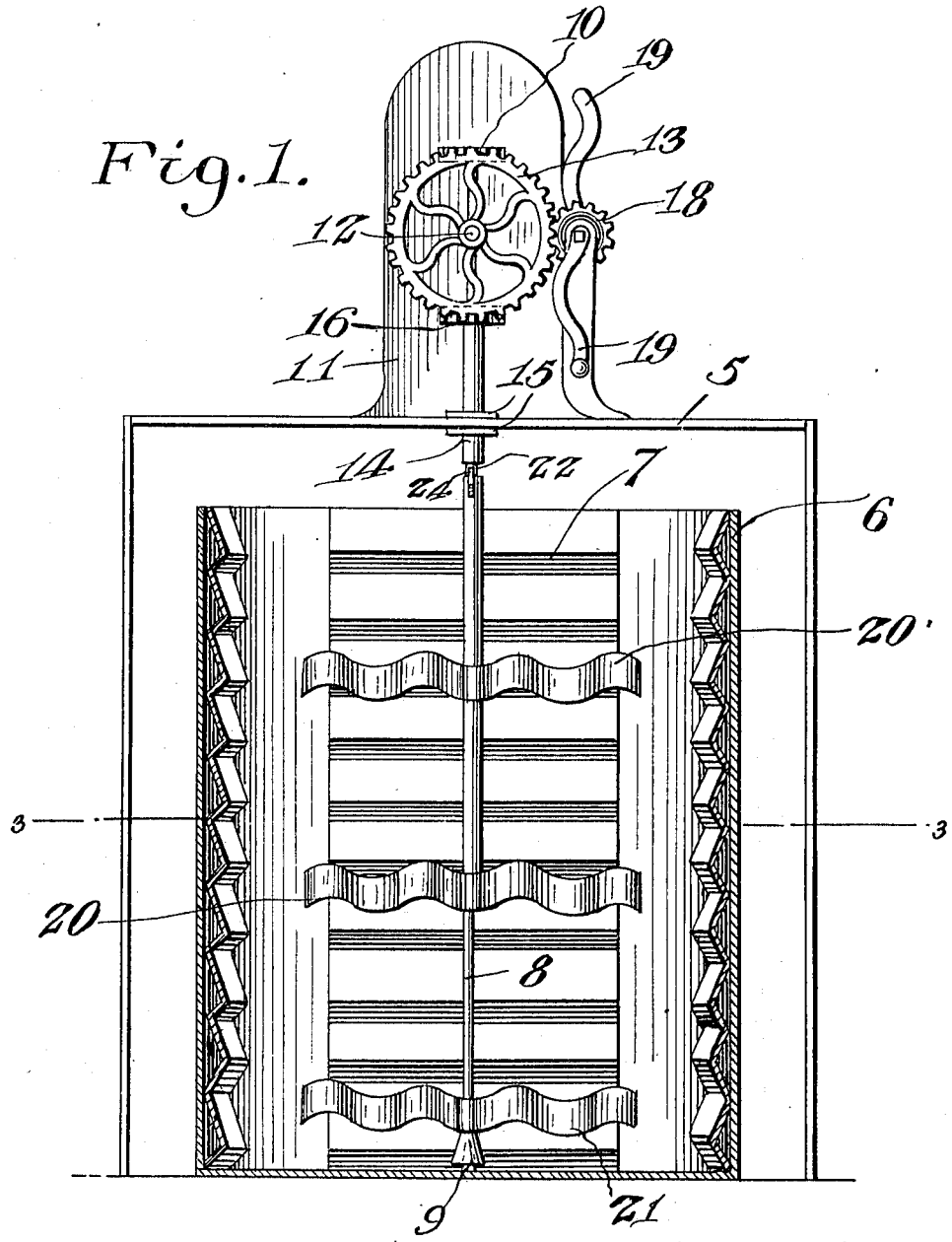

W. C. IRVINE.
CHURN.
APPLICATION FILED DEC. 9, 1909.

970,230.

Patented Sept. 13, 1910.

2 SHEETS—SHEET 1.

Witnesses:—
Joe P. Mahler.
E. M. Ricketts.

Inventor
W. C. Irvine
By Watson E. Coleman
Attorney

W. C. IRVINE.
CHURN.
APPLICATION FILED DEC. 9, 1909.
970,230.
Patented Sept. 13, 1910.
2 SHEETS—SHEET 2.
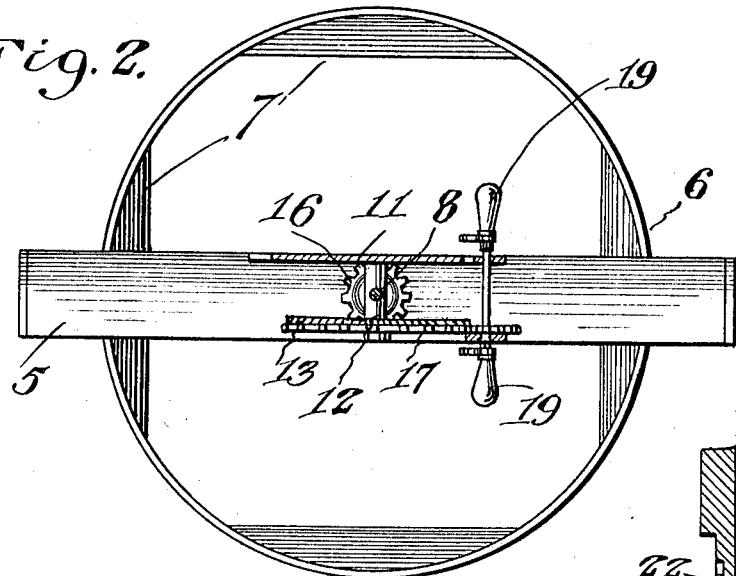
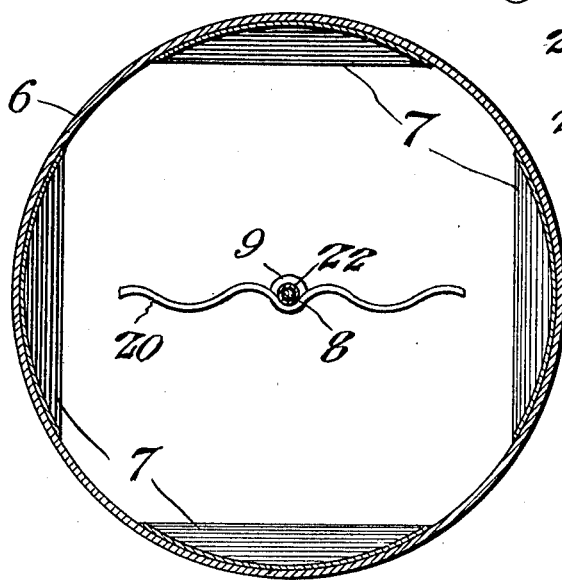
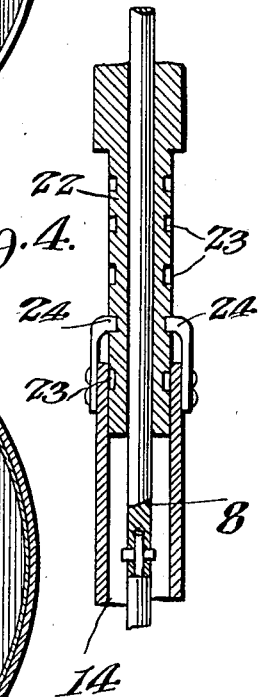
Witnesses:—
Joe. P. Wahler.
E. M. Ricketts.
Inventor
W. C. Irvine
By Watson E. Coleman
Attorney

UNITED STATES PATENT OFFICE.

WILSON CHARLES IRVINE, OF GETTYSBURG, SOUTH DAKOTA.

CHURN.

970,230. Specification of Letters Patent. Patented Sept. 13, 1910.

Application filed December 9, 1909. Serial No. 532,283.

*To all whom it may concern:*

Be it known that I, WILSON C. IRVINE, a citizen of the United States, residing at Gettysburg, in the county of Potter and State of South Dakota, have invented certain new and useful Improvements in Churns, of which the following is a specification, reference being had to the accompanying drawings.

This invention relates to certain new and useful improvements in churns and has for its object to provide a device of this character which is of simple construction, highly efficient in its operation and will quickly and efficiently perform the churning operation.

Another object is to produce a churn of such construction that the milk or cream will be thoroughly agitated in all parts of the churn body so that the butter fats contained in the fluid will be coagulated, thus eliminating waste as well as a considerable amount of time and labor.

A further object resides in the provision of means for adjusting the agitating blades or paddles so that any desired amount of cream may be churned.

With these and other object in view, the invention consists of the novel construction, combination and arrangement of parts, hereinafter fully described and claimed, and illustrated in the accompanying drawings in which:—

Figure 1 is a side elevation, the churn body being shown in section; Fig. 2 is a top plan view; Fig. 3 is a section taken on the line 3—3 of Fig. 1, and Fig. 4 is a detail section showing the manner of adjusting one of the churning blades.

Referring to the drawings, 5 indicates a frame which may be of any desired form, and within which the churn body 6 is positioned. This churn body is in the form of a cylindrical casing, to the interior of which at diametrically opposite points the corrugated plates 7 are secured. As shown, four such plates are used, though it will be understood that a greater number may be used without affecting the operation of the device.

A vertical rod or shaft 8 is centrally positioned in the churn and supported on a cone bearing 9 arranged on the base thereof, over which the enlarged conical end of the shaft 8 is disposed. This shaft extends through the top of the frame 5 and has a pinion 10 secured on its upper extremity. A standard 11 is also carried by the frame and has mounted upon a transversely extending stud 12, the power wheel 13. A second shaft 14 of tubular form also extends through the top of the frame 5 and depends into the churn body. This shaft 14 is formed in two sections, through which the primary shaft 8 extends. The upper section of the shaft 14 has rotative movement in the frame and is retained therein by means of the collars or flanges 15 disposed upon opposite sides of the frame. The upper end of this section is provided with the pinion 16. The power wheel 13 is formed with an annular rack 17 which meshes with the teeth of these pinions in its rotative movement and rotates the shafts 8 and 14 in opposite directions. A pinion 18 is mounted upon the standard 11 and cranks 19 are attached to the ends of the shaft of said pinion, by means of which the same may be rotated.

The lower portion of the sectional shaft 14 has secured upon its lower end an agitating blade 20 which extends upon opposite sides of said shaft and is preferably corrugated as shown. A similar blade 21 is secured to the lower end of the primary shaft 8. The shaft 14 also carries a second blade 20' which is loosely disposed thereon and is adapted to float upon the surface of the liquid during the churning operation and remove all particles of dirt which may collect thereon, whereby the proper sanitary conditions may be maintained. The lower section of the shaft 14 is adjustable so that the blade 20 may be positioned at various points between the top and bottom of the churn body in accordance with the amount of cream to be churned. The adjustable connection is provided by reducing the lower end of the upper section of the shaft 14, as shown at 22. This reduced end is formed with the recesses 23 at diametrically opposite points which are adapted to receive the laterally flanged ends of the spring blades 24. The tension of these spring blades is such that the two shaft sections will be very rigidly connected and will rotate together as though formed in one continuous shaft.

In the operation of my improved churn, the cream is poured into the churn vat 6, and the shaft sections 14 adjusted so that the blade 20 carried thereby will be disposed beneath the surface of the liquid, while the blade 20' will float upon the surface thereof. Upon the manipulation of the cranks 19, the shafts 8 and 14 will be simultaneously rotated in opposite directions and will agitate the entire body of liquid through the corrugated blades 20 and 21. These blades will force the cream against the corrugated plates 7 which are secured to the churn vat, and by this extreme agitation of the liquid it will be readily reduced to the consistency of butter. By providing the adjustable vane or blade 20, any amount of cream may be readily churned and the device will operate with equal efficiency under all conditions. Every particle of butter fat contained in the cream is utilized and all possibility of waste thereby eliminated. The churn may be very easily operated and the churning operation quickly completed with a minimum expenditure of manual energy.

From the foregoing it will be seen that I have produced a churn of very simple construction which may be manufactured at a minimum expense and provides a device which will greatly facilitate the production of butter and is at all times kept in a sanitary condition.

It will be understood that a suitable cover may be provided for the churn vat 6, and owing to the fact that the churning blades are rotated in opposite directions, and that means are provided within the churn to further agitate the liquid, it will be obvious that the completion of the operation will be greatly expedited thereby.

While I have shown and described what I believe to be the preferred embodiment of my invention, it will be understood that various minor alterations may be resorted to without departing from the spirit or sacrificing any of the advantages thereof.

Having thus described the invention what is claimed is:

1. In combination, a churn vat, corrugated agitating plates secured to the interior of said vat, a central vertical shaft disposed in said vat extending above the same, a support therefor, a tubular shaft movable on said first named shaft, corrugated agitating blades carried by each of said shafts, a blade loosely arranged upon the second named shaft and adapted to float on the surface of the liquid, and means for rotating said shafts in opposite directions.

2. In combination, a churn vat, corrugated agitating plates secured to the inner surface of said vat at diametrically opposite points, a vertical shaft centrally positioned in said vat mounted on a cone bearing, a supporting frame, said shaft extending through said frame, a tubular shaft mounted in said frame, said first named shaft extending therethrough, said tubular shaft being formed in two adjustable sections, agitating blades rigidly secured to each of said shafts, a vertically movable blade loosely mounted on the tubular shaft, a pinion secured to the upper end of each of said shafts, a power wheel having meshing engagement with each of said pinions, and means for manually operating said power wheel.

3. In combination, a churn vat, corrugated agitating plates secured to the interior of said vat at diametrically opposite points, a vertical shaft centrally disposed in said vat, a supporting frame for said shaft, a sectional tubular shaft extending through said frame and disposed about the first named shaft, the upper section of said tubular shaft having a reduced lower end movable in the upper end of the lower section, spring plates carried by the lower section adapted to engage in recesses in the reduced end of said shaft to secure the sections in their adjusted positions, corrugated agitating blades rigidly secured on each of said shafts, an agitating blade loosely mounted on the tubular shaft for vertical movement, pinions secured on the upper ends of each of said shafts, a power gear mounted on said frame having an annular rack on one face engaging with said pinions, a pinion engaging with said power gear, and cranks secured to the pinion shaft to impart rotary movement to the power gear to rotate said blade carrying shafts in opposite directions.

4. In combination, a churn vat, corrugated agitating plates secured to the interior of said vat, a central vertical shaft disposed in said vat and extending above the same, said shaft being formed in two detachable sections, one of said sections having a reduced extension adapted to be disposed in a socket in the end of the other of said sections, a removable pin extending through the ends of said sections to connect the same, a tubular shaft movable on said first named shaft, corrugated agitating blades carried by each of said shafts, a vertically movable blade on the second named shaft and means for rotating said blades in opposite directions.

In testimony whereof I hereunto affix my signature in the presence of two witnesses.

WILSON CHARLES IRVINE.

Witnesses:
JOHN J. SUNNE,
HENRY RAUSCH.